(12) United States Patent
Mathew et al.

(10) Patent No.: US 9,544,133 B2
(45) Date of Patent: Jan. 10, 2017

(54) ON-THE-FLY KEY GENERATION FOR ENCRYPTION AND DECRYPTION

(75) Inventors: Sanu K. Mathew, Hillsboro, OR (US); Farhana Sheikh, Hillsboro, OR (US); Ram K. Krishnamurthy, Portland, OR (US); Michael E. Kounavis, Portland, OR (US); Shay Gueron, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1365 days.

(21) Appl. No.: 12/647,459

(22) Filed: Dec. 26, 2009

(65) Prior Publication Data

US 2011/0158403 A1 Jun. 30, 2011

(51) Int. Cl.
*H04L 9/00* (2006.01)
*H04L 9/06* (2006.01)
*H04L 9/30* (2006.01)

(52) U.S. Cl.
CPC ........... *H04L 9/0631* (2013.01); *H04L 9/3073* (2013.01); *H04L 2209/24* (2013.01)

(58) Field of Classification Search
CPC ... H04L 9/0631; H04L 2209/24; H04L 9/3073
USPC ........................................................ 380/44
See application file for complete search history.

(56) References Cited

U.S. PATENT DOCUMENTS

| | | | |
|---|---|---|---|
| 6,049,878 A * | 4/2000 | Caronni et al. ................... | 726/3 |
| 6,195,756 B1 | 2/2001 | Hurd | |
| 6,298,136 B1 | 10/2001 | Den Boer | |
| 6,751,319 B2 | 6/2004 | Luyster | |
| 8,131,993 B2 * | 3/2012 | Kline et al. .................... | 713/150 |
| 8,572,370 B1 * | 10/2013 | Tormasov ...................... | 713/162 |
| 2002/0191784 A1 * | 12/2002 | Yup et al. ........................ | 380/37 |
| 2003/0202658 A1 | 10/2003 | Verbauwhede | |
| 2003/0223580 A1 * | 12/2003 | Snell ............................... | 380/28 |
| 2004/0172538 A1 * | 9/2004 | Satoh et al. .................... | 713/175 |
| 2004/0250091 A1 * | 12/2004 | Henry ................. | G06F 9/30003 713/189 |
| 2005/0058285 A1 | 3/2005 | Stein et al. | |
| 2005/0160279 A1 * | 7/2005 | Henry ................. | G06F 9/30003 713/189 |
| 2005/0213756 A1 * | 9/2005 | Hubert ........................... | 380/44 |
| 2006/0002549 A1 * | 1/2006 | Avasarala et al. .............. | 380/44 |
| 2006/0206726 A1 | 9/2006 | Wasson et al. | |
| 2007/0147604 A1 * | 6/2007 | Salgunan .............. | H04L 9/0631 380/28 |
| 2007/0157030 A1 | 7/2007 | Feghali et al. | |
| 2007/0294496 A1 * | 12/2007 | Goss et al. .................... | 711/163 |

(Continued)

OTHER PUBLICATIONS

Cheng et al, Puffin: A Novel Compact Block Cipher Targeted to Embedded Digital Systems, 2008, IEEE, pp. 383-390.*

(Continued)

*Primary Examiner* — Bradley Holder
*Assistant Examiner* — Jenise Jackson
(74) *Attorney, Agent, or Firm* — Nicholson De Vos Webster & Elliott LLP

(57) ABSTRACT

Methods and apparatus to provide on-the-fly key computation for Galois Field (also referred to Finite Field) encryption and/or decryption are described. In one embodiment, logic generates a cipher key, in a second cycle, based on a previous cipher key, generated in a first cycle that immediately precedes the second cycle. Other embodiments are also described.

10 Claims, 16 Drawing Sheets

(56) References Cited

U.S. PATENT DOCUMENTS

| | | | |
|---|---|---|---|
| 2008/0304659 A1* | 12/2008 | Ozturk et al. | 380/44 |
| 2009/0060197 A1* | 3/2009 | Taylor et al. | 380/277 |
| 2009/0168999 A1* | 7/2009 | Boswell et al. | 380/44 |
| 2009/0327730 A1* | 12/2009 | Deishi | 713/171 |
| 2010/0005289 A1* | 1/2010 | Devanand | H04L 9/0631 713/155 |
| 2010/0115286 A1* | 5/2010 | Hawkes et al. | 713/189 |
| 2010/0150350 A1* | 6/2010 | Reidenbach | 380/277 |
| 2010/0246828 A1* | 9/2010 | Johnston | 380/278 |
| 2011/0055585 A1* | 3/2011 | Lee | H04L 9/0844 713/183 |
| 2012/0110340 A1* | 5/2012 | Lyseggen et al. | 713/186 |
| 2012/0201374 A1* | 8/2012 | Ciet et al. | 380/28 |
| 2012/0237035 A1* | 9/2012 | Kawabata et al. | 380/277 |
| 2012/0250863 A1* | 10/2012 | Bukshpun et al. | 380/278 |

OTHER PUBLICATIONS

Li, A Parallel S-box Architecture for AES Byte Substitution, 2004, IEEE, pp. 1-3.*

Hamalainen et al, Design and Implementation of Low-Area and Low-Power AES Encryption Hardware Core, 2006, IEEE, pp. 1-7.*

Federal Information Processing Standards Publication 197, Announcing the Advanced Encryption Standard (AES), Nov. 26, 2001, pp. 1-51.

Bhargav, Shrivathsa et al., "128-bit AES decryption," CSEE 4840 Project Report, Columbia University, May 2008, 101 pages.

Didla, Shammi et al., "Optimizing AES for Embedded Devices and Wireless Sensor Networks," Proceedings 4th International Conference on Testbeds and research infrastructures for the development of networks & communities, Article No. 4, ISBN: 978-963-9799-24-0, 2008, 10 pages.

* cited by examiner

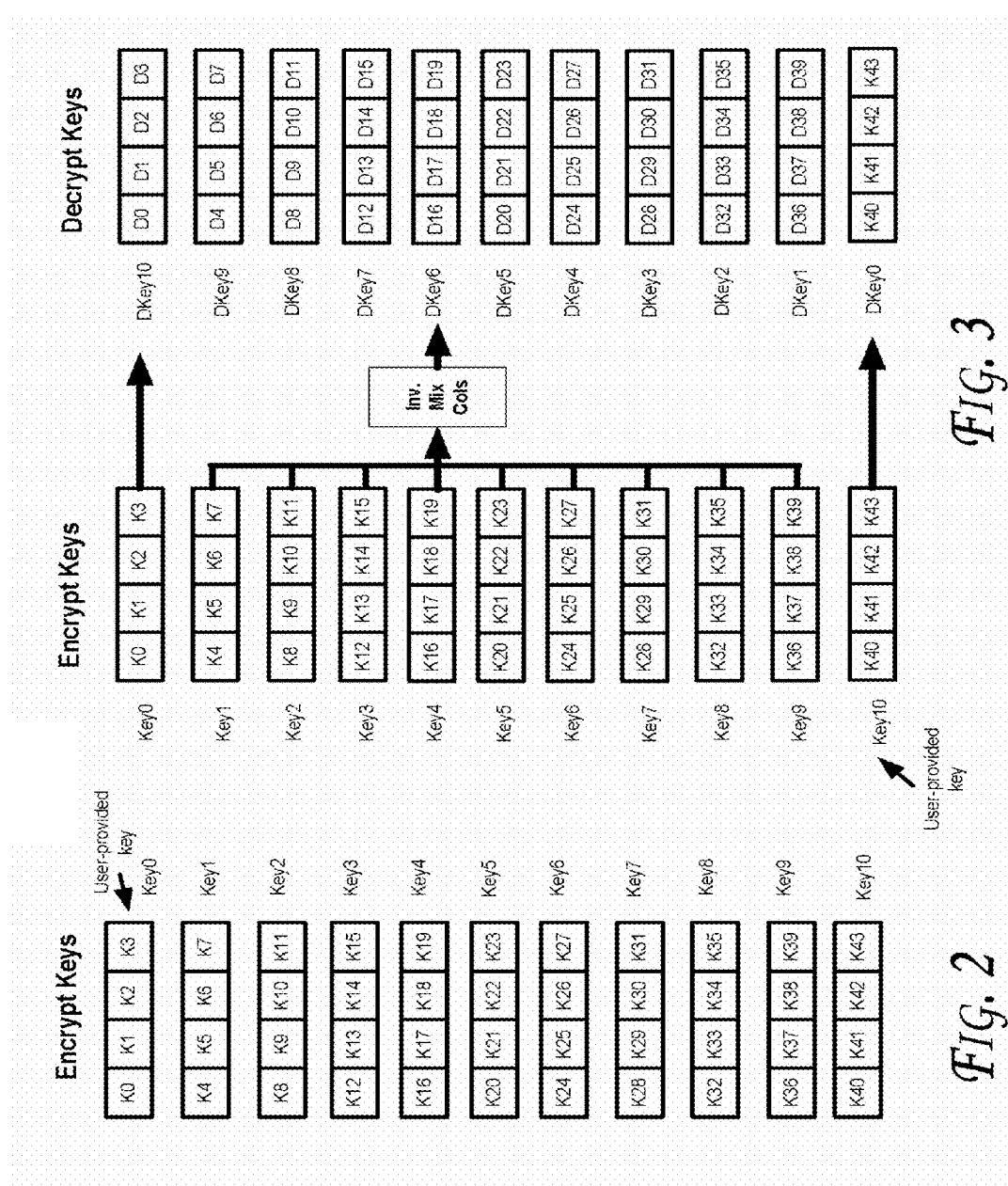

ON-THE-FLY KEY GENERATION FOR ENCRYPTION AND DECRYPTION

FIELD

The present disclosure generally relates to the field of computing. More particularly, an embodiment of the invention generally relates to techniques for on-the-fly key generation for encryption and/or decryption.

BACKGROUND

In cryptography, a block cipher may be a symmetric key cipher which operates on fixed-length groups of bits referred to as "blocks." For example, during encryption, a block cipher may take a 128-bit block of plaintext as input and output a corresponding 128-bit block of ciphertext in accordance with a secret key. For decryption, the 128-bit block of ciphertext and the secret key may be used to determine the original 128-bit block of plaintext.

One type of block cipher is Advanced Encryption Standard (AES). AES-related computations generally operate in iterative loops. Each iteration of the loop computation may use a unique round key to encrypt plain-text to cipher-text or decrypt ciphertext into plaintext. Generally, the round keys are stored in memory, e.g., due to resource constraints. This however poses a potential security hole, as the stored keys may be accessed in an unauthorized fashion and be vulnerable to snooping.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIGS. 2-3 illustrate sample keys according to some embodiments.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software (including for example micro-code that controls the operations of a processor), or some combination thereof. Also, the use of "instruction" or "micro-operation" (which may also be referred to as "uop") herein may be interchangeable.

Some of the embodiments discussed herein provide for on-the-fly (e.g., in real-time) key computation for encryption and/or decryption. In one embodiment, the key generation may be performed for mapped or native composite GF ("Galois Field" also referred to as Finite Field) AES encryption and/or decryption. In an embodiment, logic (such as those discussed herein with reference to FIGS. 1-18) may generate one or more round keys based on an initial AES key (e.g., where the initial AES key is user supplied, in an embodiment). The generated key(s) may then be used by some logic (such as a processor or a processor core, a network device, etc.) to encrypt or decrypt content data (including for example multimedia content such as audio and/or video content). The content data may be stored in a memory device such as those discussed with reference to FIG. 1, 16, or 17.

In some embodiments, the key(s) are generated on-the-fly (and at a location where they are consumed in one embodiment) avoiding the need to store the key(s) in a shared memory. As discussed herein, a "shared memory" refers to a memory that is accessible by more than one producer and one consumer. Generally, a producer stores data in a memory and a consumer reads the stored data from that memory. Accordingly, a non-shared memory refers to a memory that may only be accessible by a single entity/component or two entities/components (where the two entities consist of one consumer and one producer). Moreover, a single component/entity may operate as both a producer and a consumer. Generation of key(s) without storing them in a shared memory allows for avoidance (or at least reduction) of potential vulnerabilities associated with storing data in a shared memory including snooping.

Figure 1:
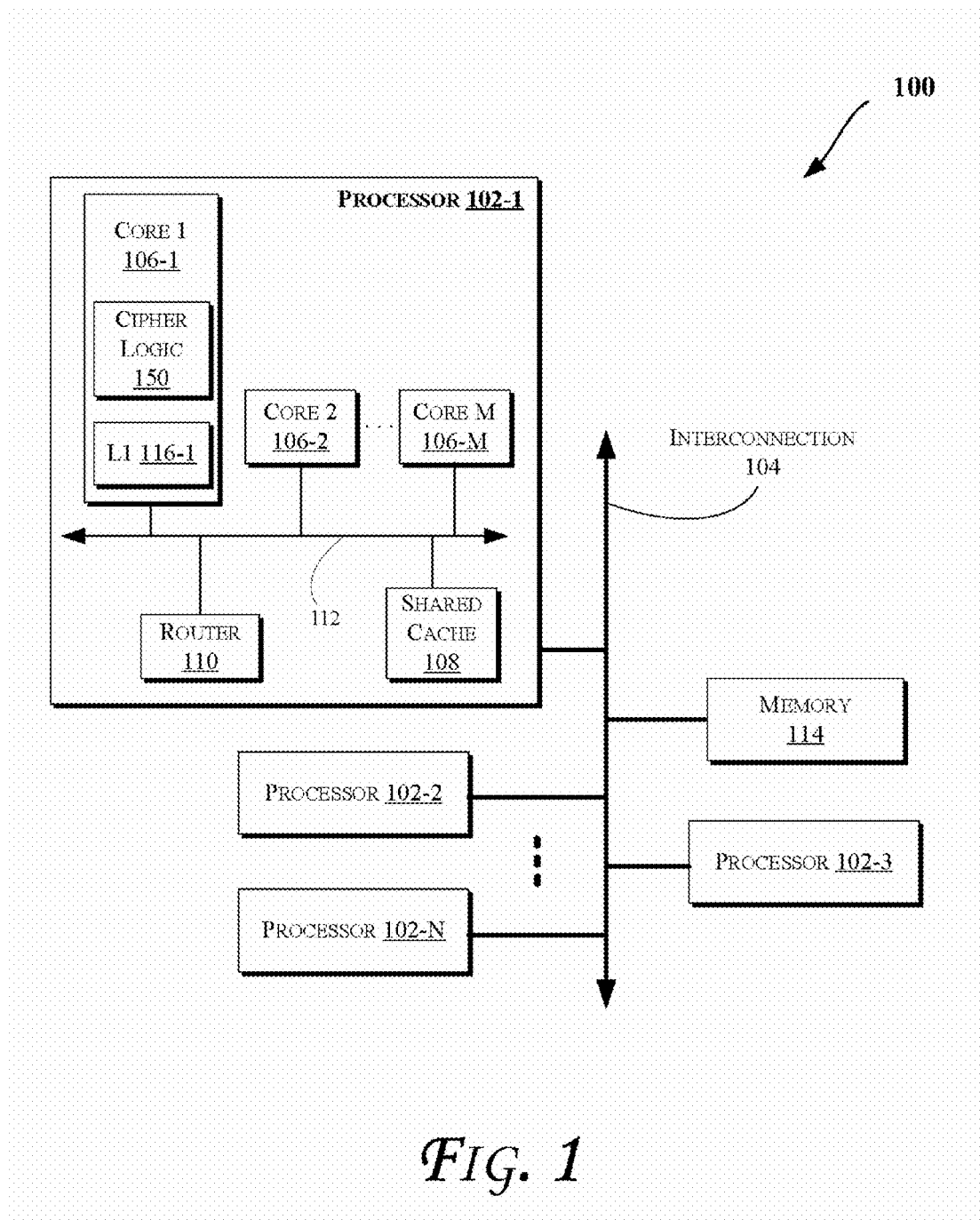
FIGS. 1, 16, and 17 illustrate block diagrams of embodiments of computing systems, which may be utilized to implement some embodiments discussed herein.

Techniques described herein may allow for improved encryption/decryption performance in various computing devices, such as those discussed for example with reference to FIGS. 1-18. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection network or bus 104. Each processor may include various components, some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, and/or a router 110. The processor cores 106 may be implemented on a single integrated circuit (IC) chip. Moreover, the chip may include one or more shared and/or private caches (such as cache 108), buses or interconnections (such as a bus or interconnection network 112), memory controllers (such as those discussed with reference to FIGS. 16 and 17), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a mid-level cache (MLC) (such as a level 2 (L2), a level 3 (L3), a level 4 (L4), or other levels of cache), a last level cache (LLC), and/or combinations thereof. Moreover, various components of the processor 102-1 may communicate with the shared cache 108 directly, through a bus (e.g., the bus 112), and/or a memory controller or hub. As shown in FIG. 1, in some embodiments, one or more of the cores 106 may include a level 1 (L1) cache (116-1) (generally referred to herein as "L1 cache 116") and/or an L2 cache (not shown).

Also, processor 102-1 may include a prefetch engine (not shown) which may prefetch data from memory 114 (or another cache level) into one of the caches discussed above. As shown, processor core 106 may include a cipher logic 150 to encrypt and/or decrypt data, including multimedia content (such as audio and/or video data), as will be further discussed herein, e.g., with reference to FIGS. 2-18 (for example, where logic 150 includes one or more components discussed with reference to FIGS. 4-15). Furthermore, even though some figures illustrate logic 150 to be inside a processor or core, logic 150 may be provided within other components of computing systems discussed herein, such as within any components of systems discussed with reference to FIG. 1, 16, or 17.

In an embodiment, a single datapath is to generate encrypt or decrypt round key(s) and/or support both mapped and native composite field AES implementations. The single datapath may also be reconfigured in real-time to support AES-128/192/256 modes of operation, with maximal sharing of hardware resulting in an energy-efficient circuit implementation. For example, in the encrypt mode of operation (see, e.g., FIG. 2), the user-provided key (Key 0) is input into the key generator in cycle 1. In AES-128 mode of operation, the key generator generates a new round key every cycle (Key 1 to Key 10) for the next 10 cycles. In the decrypt mode of operation (see, e.g., FIG. 3), the datapath works in the reverse direction, with the user-provided key (Key 10) used to generate Key 9 to Key 0. These keys may go through an Inverse Mix Column block to generate the decrypt round key.

Furthermore, contrary to some current designs which require several cycles to generate a round key, an embodiment allows for key generation to be performed in a single cycle, e.g., reducing power consumption compared with a key generated in multiple cycles. Also, some embodiments enable the ability to handle all modes of AES encryption/decryption (AES-128, AES-192, AES-256), including the more complicated AES-192 mode, with minimal additional hardware as will be further discussed below. Moreover, the techniques and logic discussed herein for on-the-fly key generation may be provided in a processor, network device (wired or wireless), and other security hardware. For example, AES may be used for protection of media content data (including audio and/or video content data) and/or DRM (Digital Rights Management).

Figure 4:
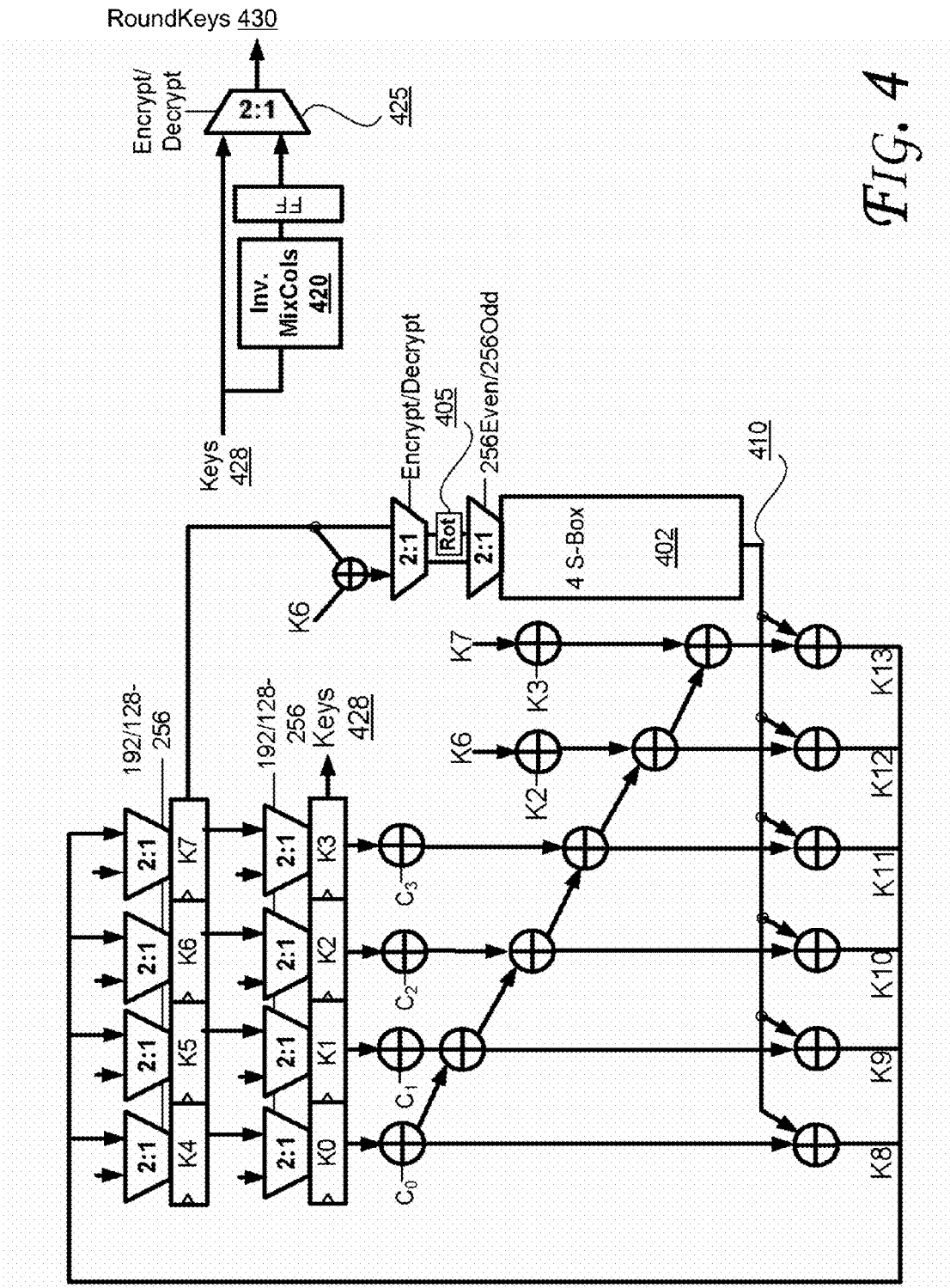
FIGS. 4-15 illustrate various components of a cipher logic, according to some embodiments.
Figure 5:
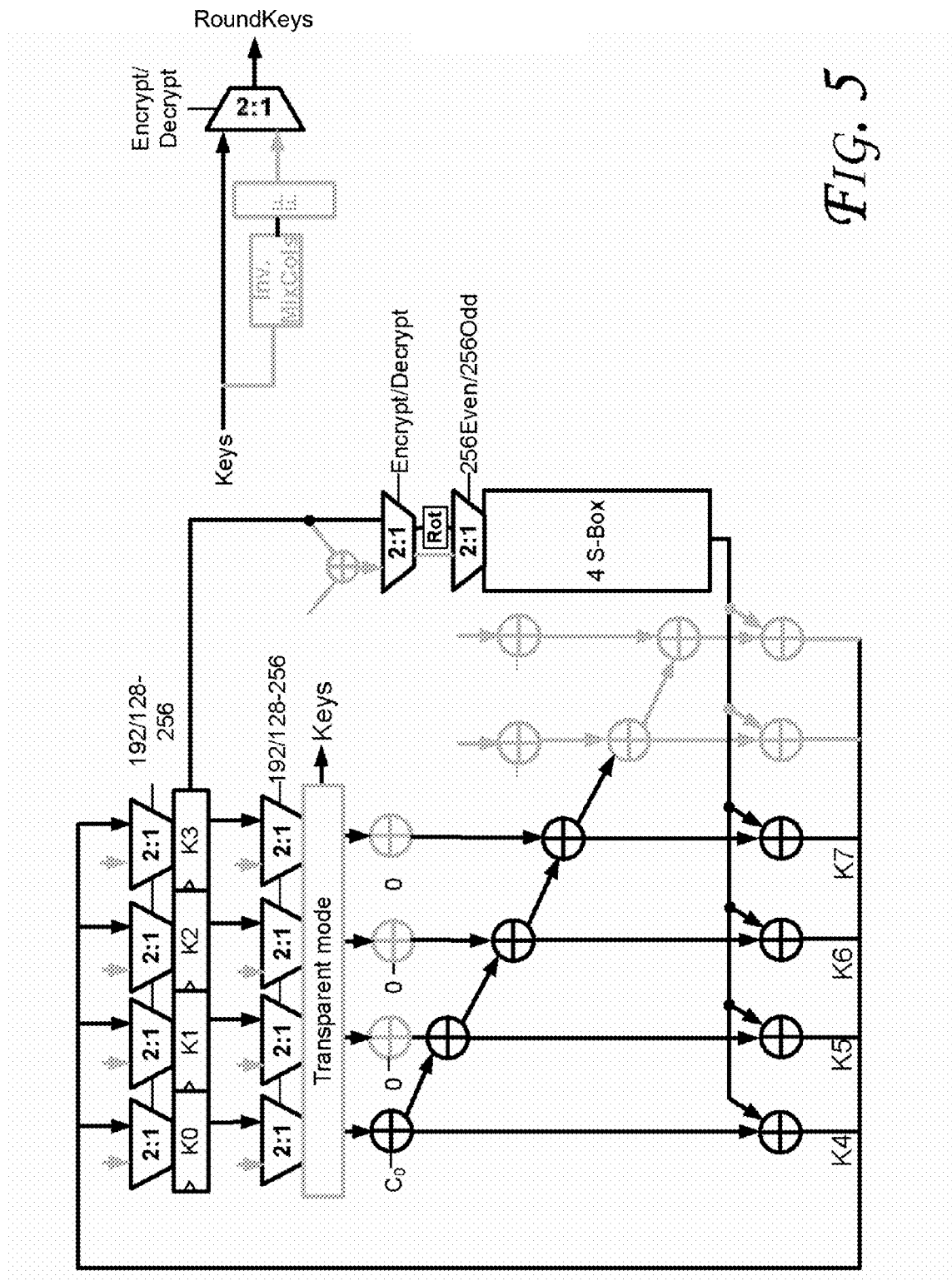
Figure 10:
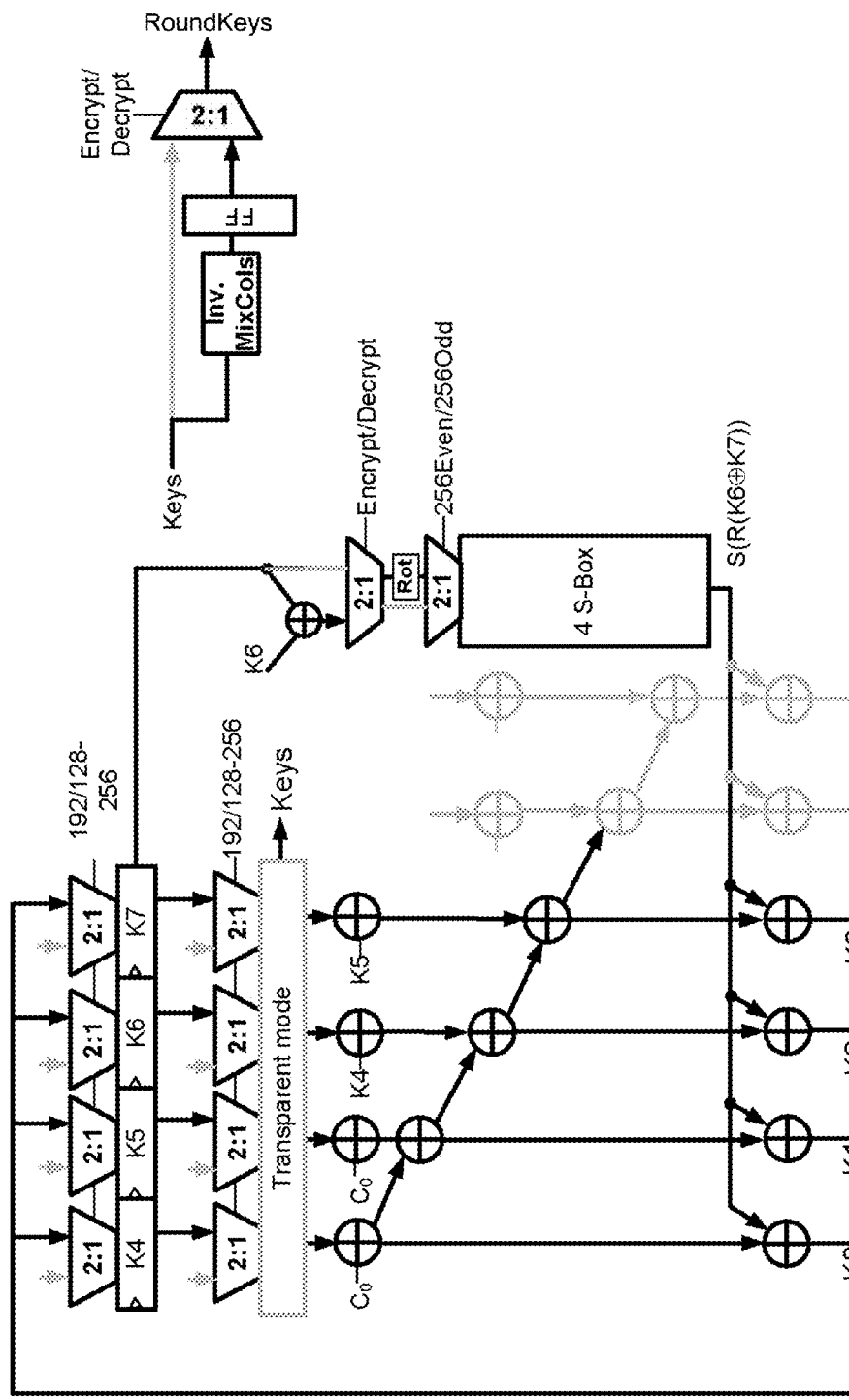
Figure 11:
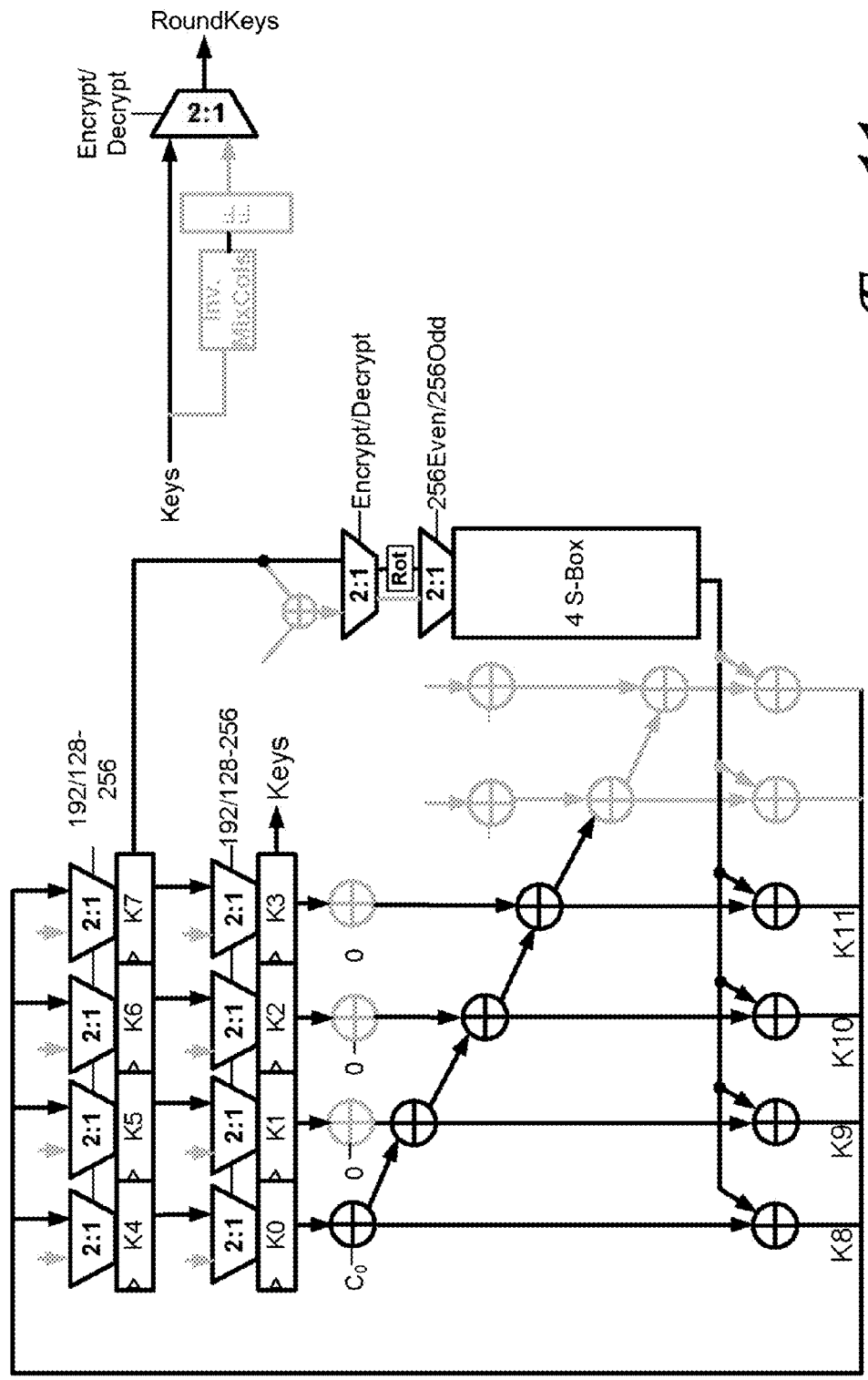
Figure 12:
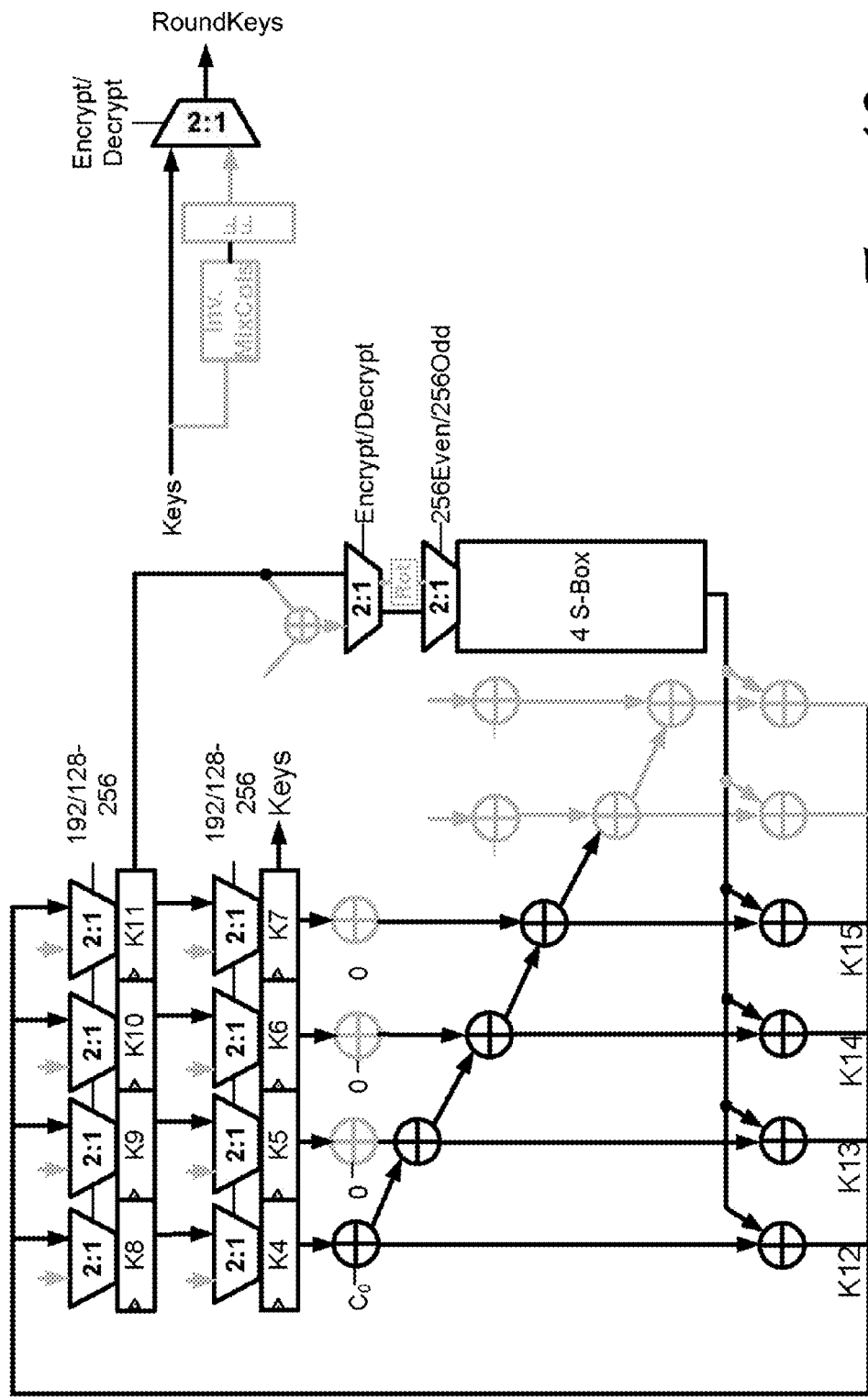
Figure 13:
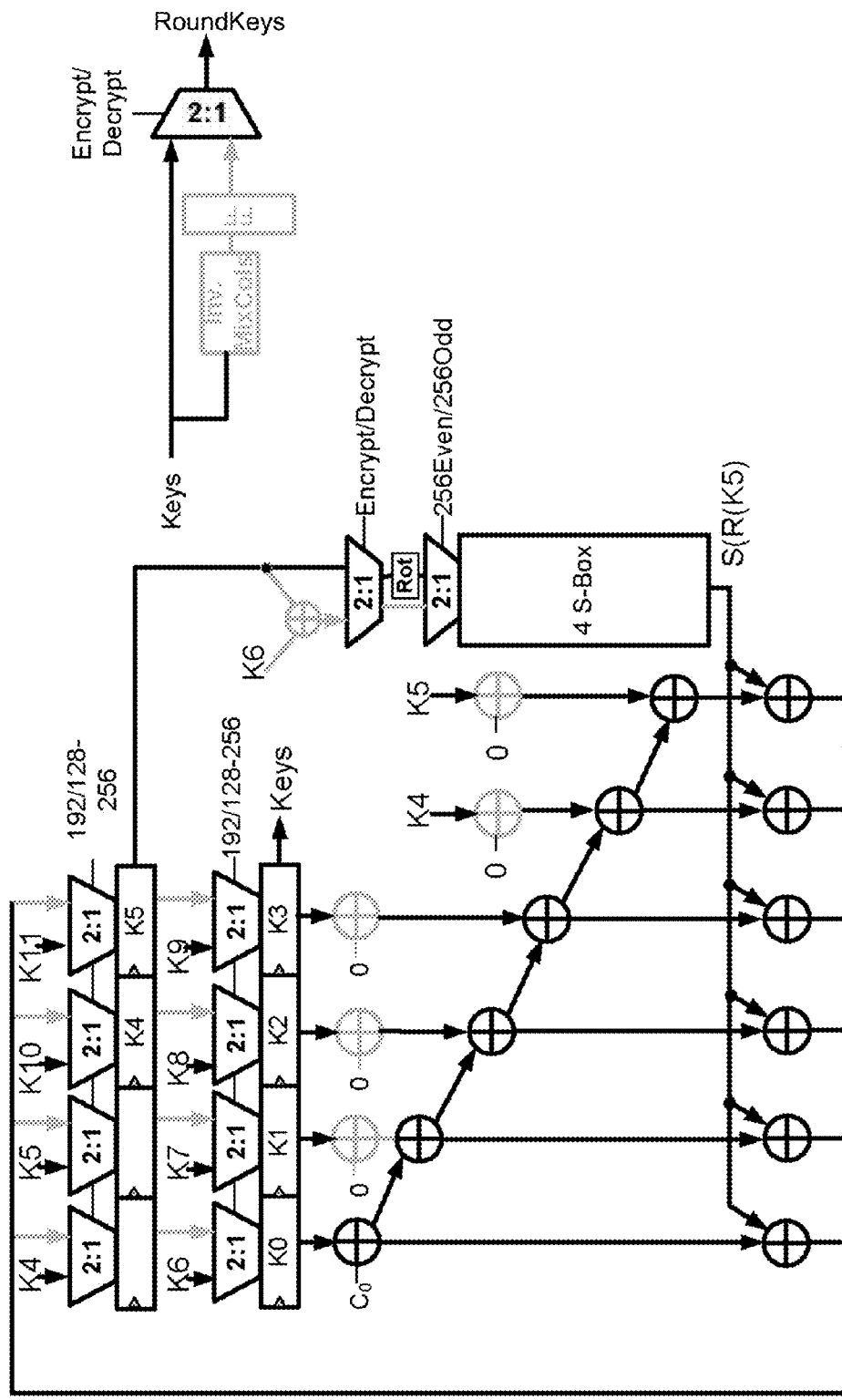
Figure 14:
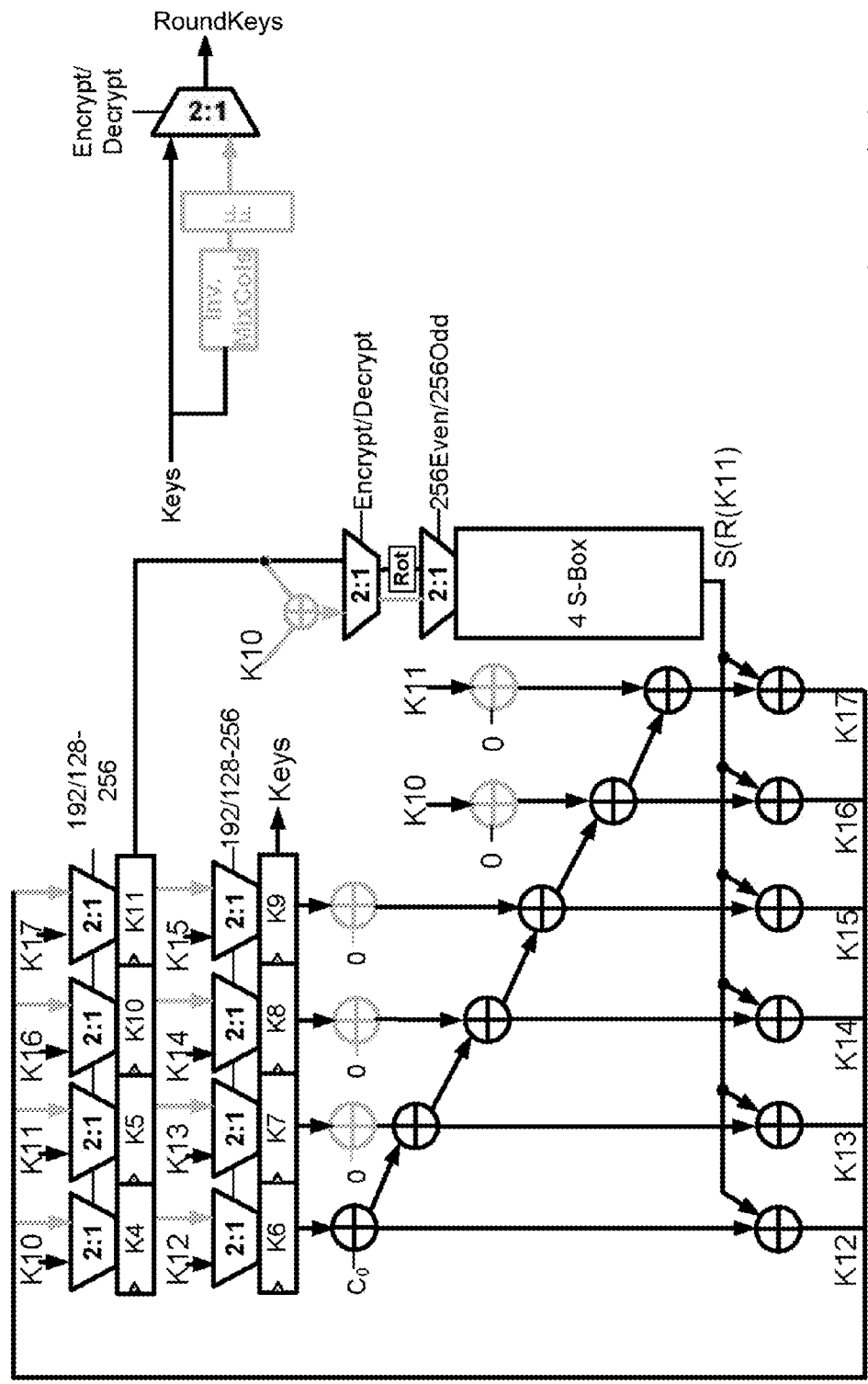
Figure 15:
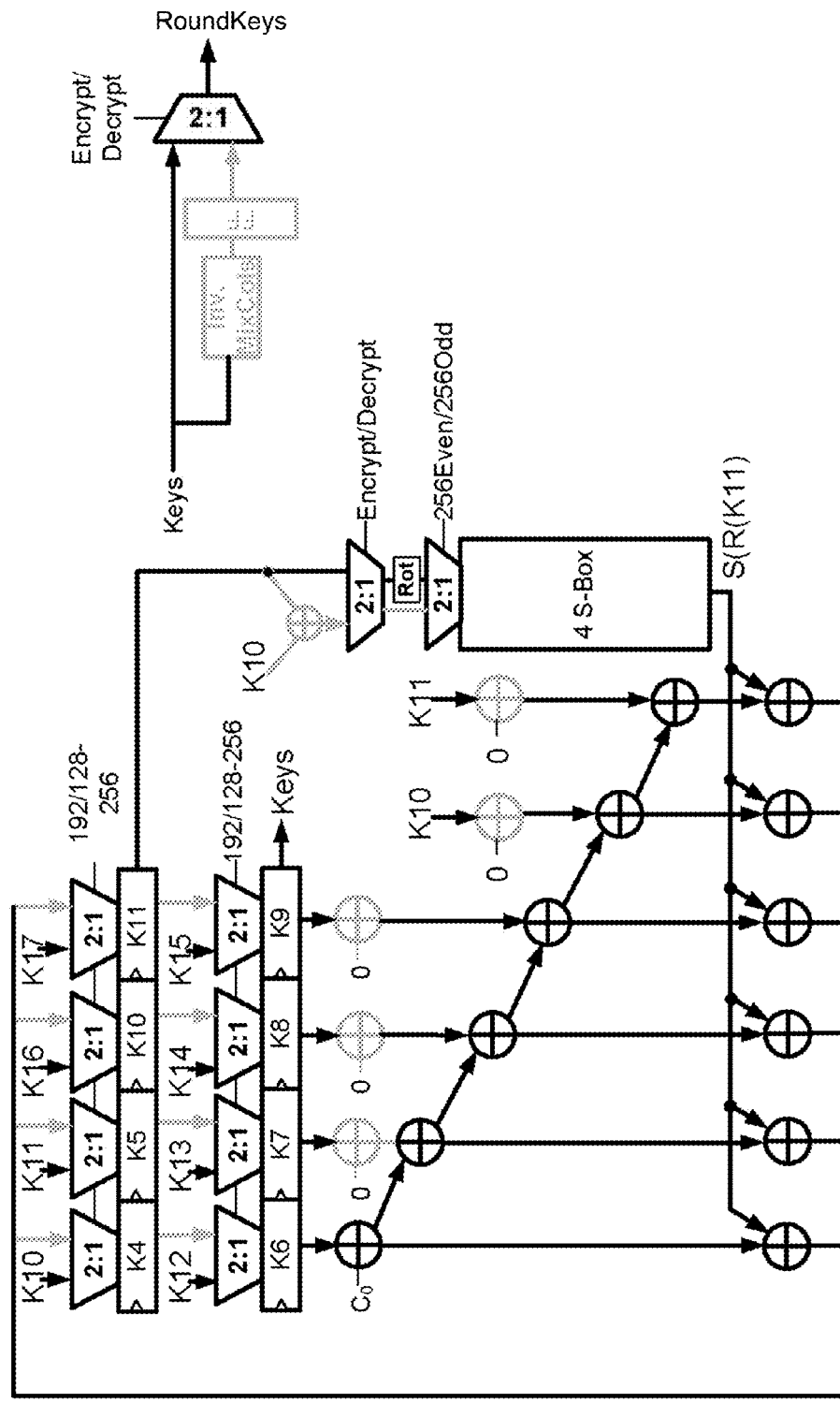

FIG. 4 illustrates a key generator logic according to an embodiment. More specifically, a unified on-the-fly key generator circuit is shown in FIG. 4. The datapath takes in a 256-bit input (stored in 32 bit flip-flops K0-K7). Arrays of XORs (eXclusive OR logic gates) conditionally add constants C0-C3 to the inputs, depending on operating mode. In an embodiment, the constant C0 changes every iteration and is given as in the table below in hexadecimal format for AES-128/192/256 encrypt and decrypt. C1-C3 are equal to 0 for AES-128 for encrypt as shown in FIG. 5 and for decrypt, C1-C3 are shown in FIG. 10. For AES-192 encrypt, C1-C3 are shown in FIGS. 13-15. For AES-256 encrypt, C1-C3 are shown in FIGS. 11-12.

| AES Round | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Encrypt | | | | | | | | | | | | | | |
| AES-128 | 01 | 02 | 04 | 08 | 10 | 20 | 40 | 80 | 1b | 36 | | | | |
| AES-192 | 01 | 02 | | 04 | 08 | | 10 | 20 | | 40 | 80 | | | |
| AES-256 | 01 | | 02 | | 04 | | 08 | | 10 | | 30 | | 40 | |
| Decrypt | | | | | | | | | | | | | | |
| AES-128 | 36 | 1b | 80 | 40 | 20 | 10 | 08 | 04 | 02 | 01 | | | | |
| AES-192 | 80 | 40 | | 20 | 10 | | 08 | 04 | | 02 | 01 | | | |
| AES-256 | | 40 | | 20 | | 10 | | 08 | | 04 | | 02 | | 01 |

Four S-box (Substitution box) units 402 perform a substitute byte operation on K7, a rotated 405 and/or XOR-ed version of K7 (as shown in FIG. 4) to generate a 32 bit word that is added to the XOR array results to generate the outputs for the next cycle 410. An Inverse Mix Column block 420 (coupled to an encrypt/decrypt multiplexer 425, e.g., through a Flip/Flop (FF)) conditionally processes the output keys 428 during decrypt mode to generate the decrypt keys 430.

In the AES-128 encrypt mode of operation (see, e.g., FIG. 5), the user-provided 128-bit key is stored in K0-K3. The second set of input flip-flops operate in a transparent mode in this configuration. The 128b output (K4-K7) loops back into the input and is used to compute the round keys for the next cycle. The serial dependence of K5, K6 and K7 on K4, K5 and K6 is computed in parallel to the S(R(K3)) computation (which computes the substitute byte operation on the rotated/unrotated version of the 32 bit K3 input). This organization removes this serial-chain from the critical path loop. The round keys in each cycle are available in K0-K3. Sections of the logic that are disabled/unused in this mode are shaded in grey in FIGS. 5-15.

In an embodiment, K4 to K7 are computed by the logic of FIG. 5 as follows:

$$K4 = S(R(K3)) \oplus C0 \oplus C \oplus K0$$

$$K5 = K4 \oplus K1$$

$$K6 = K5 \oplus K2$$

$$K7 = K6 \oplus K3$$

Figure 6:
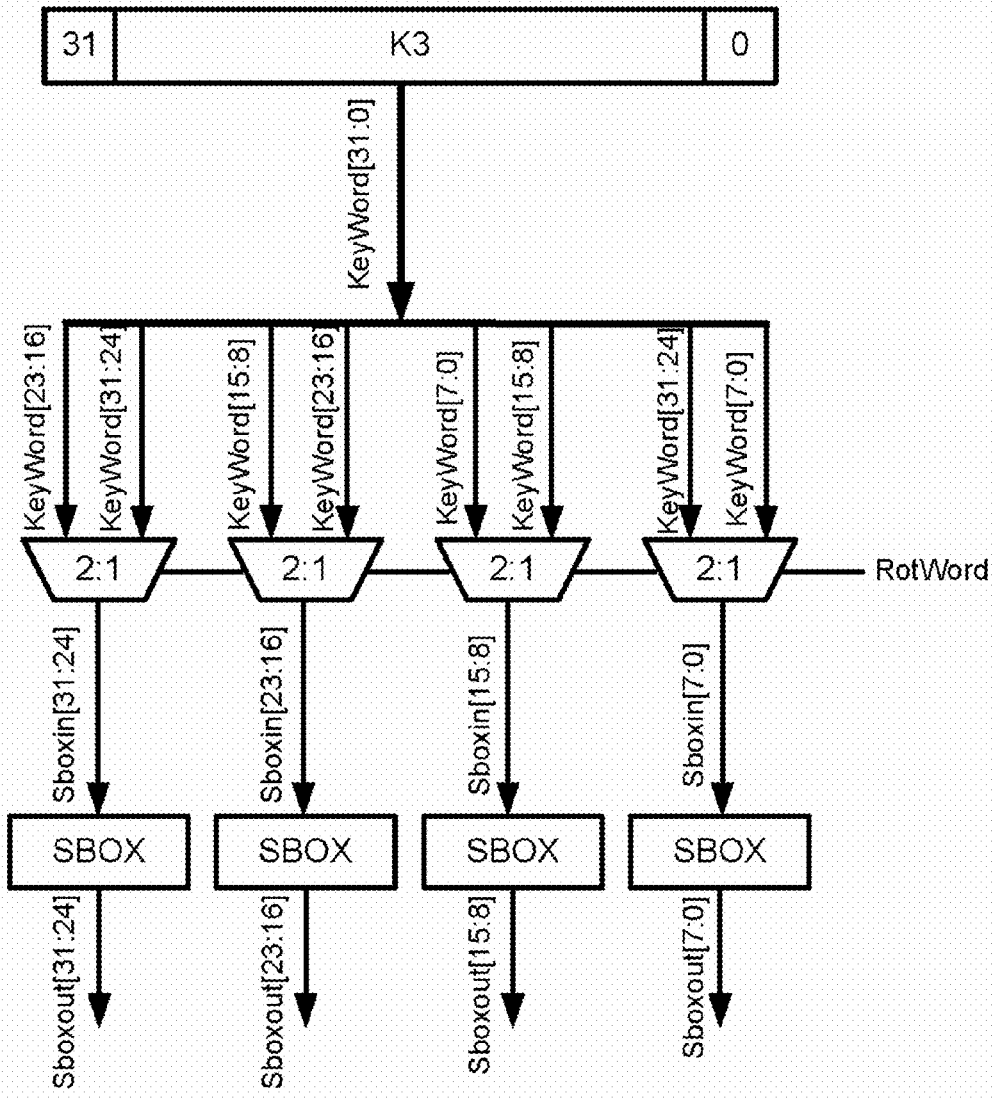
Figure 7:
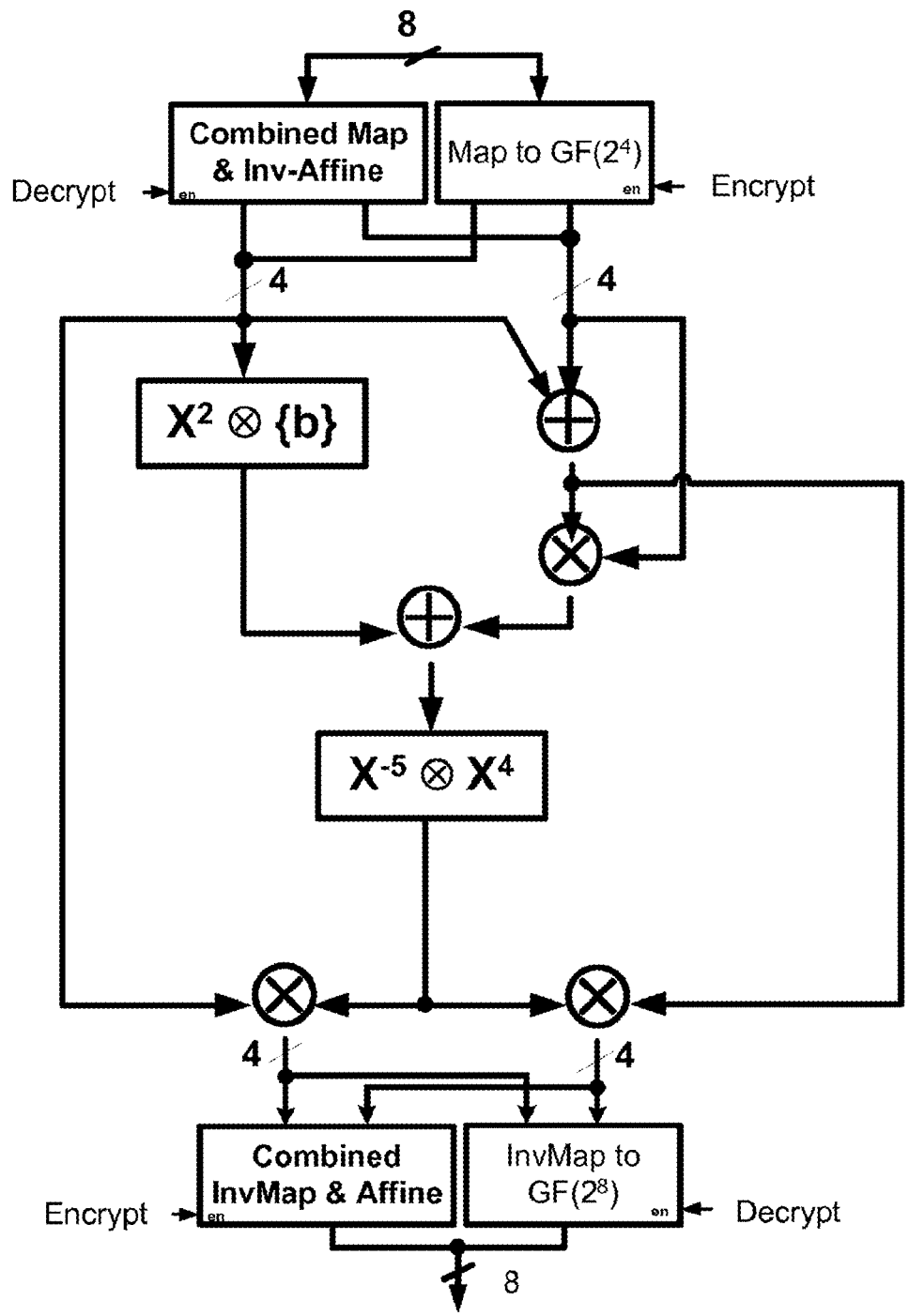
Figure 8:
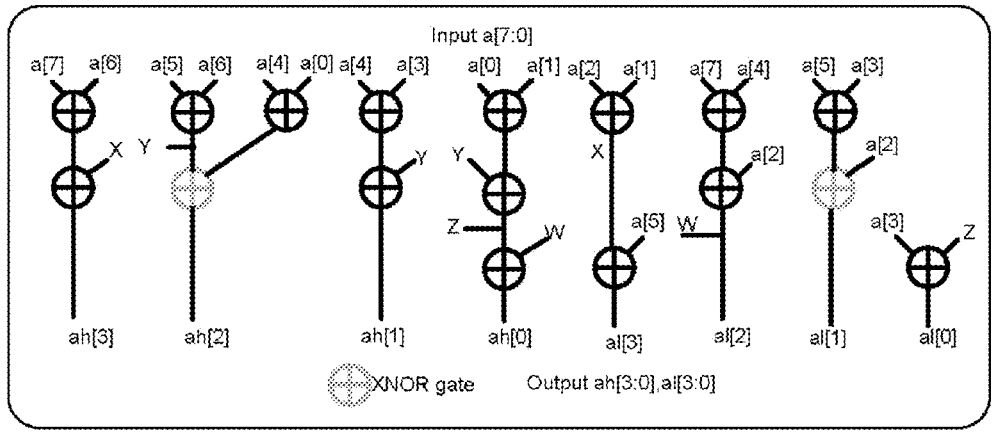
Figure 9:
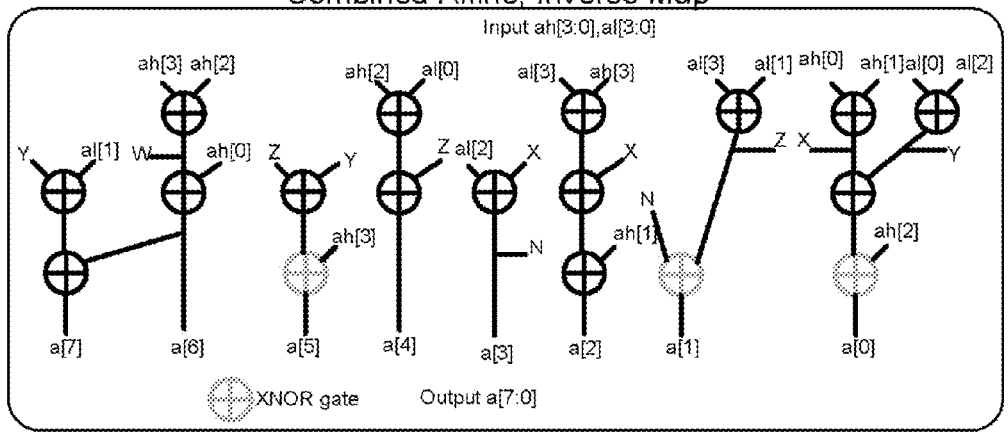

FIG. 6 illustrates a rotate and S-box logic according to an embodiment. As shown, the S(R(Input)) function computes the substitute byte operation on the rotated/unrotated version of the 32 bit input. This function uses four S-box logics to compute the Substitute Byte operation on the byte-size input. The S-box logic operates in mapped or native $GF(2^4)^2$ composite field representation. The mapped S-box may be optimized by the use of combined Map and Inverse Affine transformation matrix (see, e.g., FIG. 7) during decrypt and a combined Affine and Inverse Map transformation matrix during encrypt. In some implementations, the use of these combination matrices may reduce S-box delay by 28% for a 4% increase in area in some embodiments. The implementation of the combination matrices are shown in FIG. 7. FIGS. 8-9 illustrate sample map and inverse map for combined inverse affine and combined affine, respectively, according to some embodiments.

In the AES-128 decrypt mode of operation (see, e.g., FIG. 10), the user-provided key K4-K7 is loaded into the input flip-flops. The S(R(Input)) function takes K6⊕K7 as the input, thus utilizing an extra XOR stage before the S-box and Rotate operations. As can be seen, the output equations for K5-K7 are simpler than the corresponding encrypt equations. Double XORing of C0, K4 and K5 is done in the XOR-array to enable the use of a unified datapath for both encrypt and decrypt modes. Furthermore, the S-Box outputs are used for computation of K0 only. The computed keys are then sent through the Inverse Mix Column block to generate the final decrypt round keys.

In an embodiment, K0 to K3 are computed by the logic of FIG. 10 as follows:

$$K0 = S(R(K6 \oplus K7)) \oplus C0 \oplus K4$$

$$K1 = K5 \oplus K4$$

$$K2 = K6 \oplus K5$$

$$K3 = K7 \oplus K6$$

In the AES-256 modes (see e.g., FIGS. 11-12), the datapath is reconfigured every cycle to perform the specific computations required in even and odd rounds. The user-provided 256b key is loaded into the input flip-flops K0-K7. During even rounds (FIG. 11), keys K0-K3 are send out as the round keys and outputs K8-K11 are computed using K0,K1,K2,K3 and K7. These outputs then loop back into the input for next round key computation. K4, K5 and K6 are not used for key computation in even rounds. During the odd rounds (FIG. 12), keys K0-K3 used in the previous round are discarded. Keys K4-K7 move to the second row of flip-flops that previously held K0-K3. At the same time, outputs computed in the even round are held in the first row of flip-flops. The outputs are now computed using K4,K5,K6, K7 and K11. The Rotate( ) function is not used in the odd rounds. The rest of the datapath remains unchanged.

In an embodiment, K8 to K11 are computed by the logic of FIG. 11 as follows (wherein inputs are K0-K7, round keys are K0-K3, and outputs are K8-K11):

$$K8 = S(R(K7)) \oplus C0 \oplus K0$$

$$K9 = K8 \oplus K1$$

$$K10 = K9 \oplus K2$$

$$K11 = K10 \oplus K3$$

In an embodiment, K12 to K15 are computed by the logic of FIG. 12 as follows (wherein inputs are K4-K11, round keys are K4-K7, and outputs are K12-K15):

$$K12 = S(K11) \oplus C0 \oplus K4$$

$$K13 = K12 \oplus K5$$

$$K14 = K13 \oplus K6$$

$$K15 = K14 \oplus K7$$

AES-192 mode of operation is different from 128 and 256 modes (see, e.g., FIGS. 13-15). The key generator computes 192$b$ of output every cycle vs. 128-bit in each of the other modes. The user-provided 192b key (K0-K5) is distributed between the 2 rows of flip-flops as shown in FIG. 13. The loopback of the outputs into the input flip-flops is also distributed between the 2 rows of flip-flops as shown in FIG. 13. The routing of the output keys to the appropriate set of flip-flop is handled by the 2:1 multiplexers at the flip-flop input. Cycles 2 and 3 of AES-192 (see, e.g., FIGS. 14 and 15, respectively) encrypt are computed in one cycle. During Cycle 3 (see, e.g., FIG. 15), inputs are K6-K11, outputs are K12-K17, the clock is quiet and K8-K11 is send out as the round key. Similar equations for decrypt may be applied to the same datapath.

In an embodiment, K6 to K11 are computed by the logic of FIG. 13 as follows (where inputs are K0-K5, round key is K0-K3, and outputs are K6-K11):

$$K6 = S(R(K5)) \oplus C0 \oplus K0$$

$$K7 = K6 \oplus K1$$

$$K8 = K7 \oplus K2$$

$$K9 = K8 \oplus K3$$

$$K10 = K9 \oplus K4$$

$$K11 = K10 \oplus K5$$

In an embodiment, K12 to K17 are computed by the logic of FIG. 14 as follows (where inputs are K6-K11, round keys are K4-K7, and outputs are K12-K17):

$$K12 = S(R(K11)) \oplus C0 \oplus K6$$

$$K13 = K12 \oplus K7$$

$$K14 = K13 \oplus K8$$

$$K15 = K14 \oplus K9$$

$$K16 = K15 \oplus K10$$

$$K17 = K16 \oplus K11$$

Figure 16:
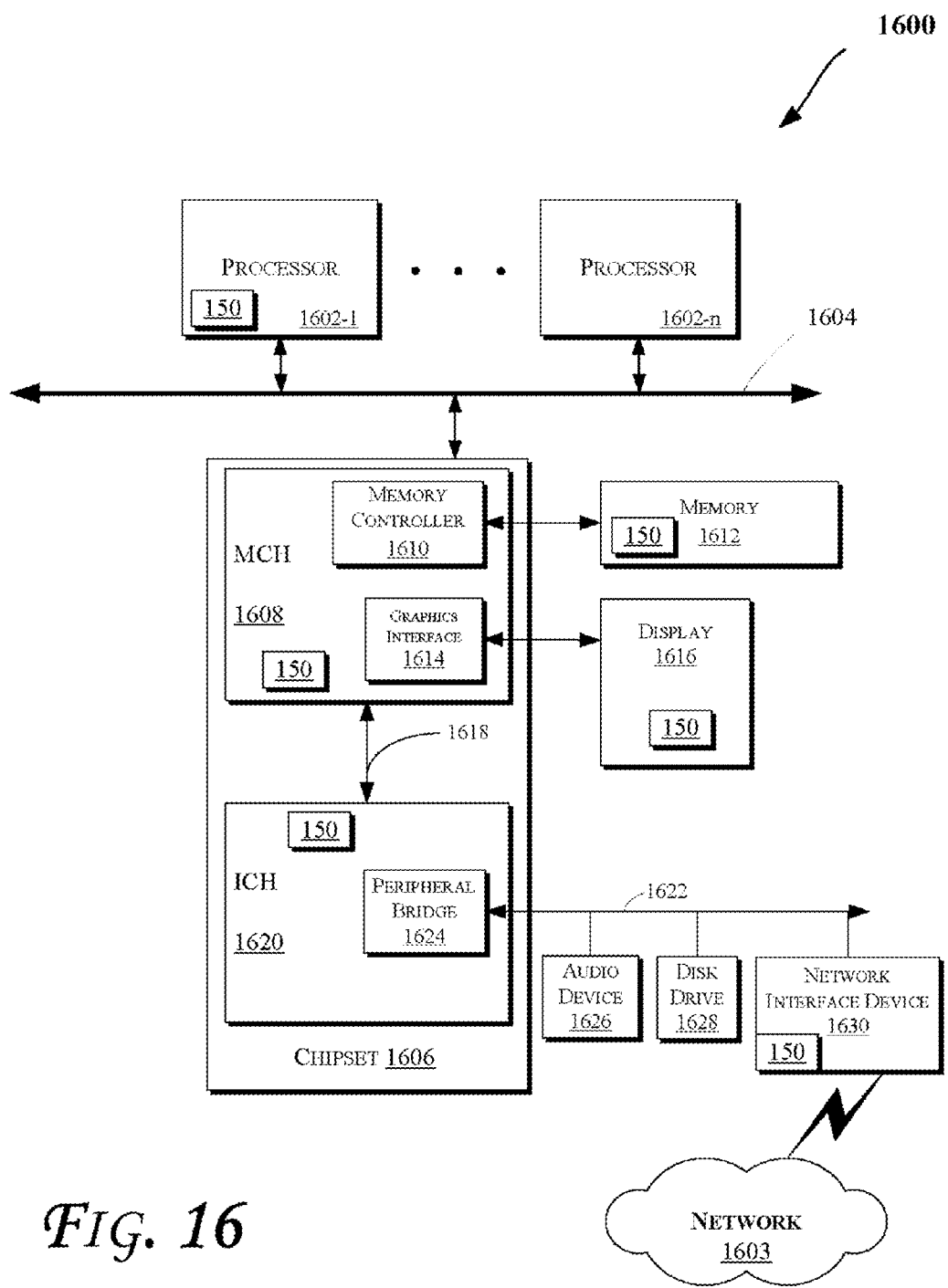

FIG. 16 illustrates a block diagram of an embodiment of a computing system 1600. In various embodiments, one or more of the components of the system 1600 may be provided in various electronic devices capable of performing one or more of the operations discussed herein with reference to some embodiments of the invention. For example, one or more of the components of the system 1600 may be used to perform the operations discussed with reference to FIGS. 1-15, e.g., by processing ciphertext(s) data 106-1, 106-2, etc. in accordance with the operations discussed herein. Also, various storage devices discussed herein (e.g., with reference to FIGS. 16 and/or 17) may be used to store data, operation results, etc. Also, various components of system 1600 may include the cipher logic 150, e.g., to encrypt and/or decrypt data, including multimedia content (such as audio and/or video data). Even though presence of logic 150 is shown in some components of system 1600, logic 150 may be present in more or less components.

Moreover, the computing system 1600 may include one or more central processing unit(s) (CPUs) 1602 or processors that communicate via an interconnection network (or bus) 1604. The processors 1602 may include a general purpose processor, a network processor (that processes data communicated over a computer network 1603), or other types of a processor (including a reduced instruction set computer (RISC) processor or a complex instruction set computer (CISC)). Moreover, the processors 1602 may have a single or multiple core design. The processors 1602 with a multiple core design may integrate different types of processor cores on the same integrated circuit (IC) die. Also, the processors 1602 with a multiple core design may be implemented as symmetrical or asymmetrical multiprocessors. Moreover, the operations discussed with reference to FIGS. 1-15 may be performed by one or more components of the system 1600.

A chipset 1606 may also communicate with the interconnection network 1604. The chipset 1606 may include a memory control hub (MCH) 1608. The MCH 1608 may include a memory controller 1610 that communicates with a memory 1612. The memory 1612 may store data, including sequences of instructions that are executed by the CPU 1602, or any other device included in the computing system 1600. In one embodiment of the invention, the memory 1612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 1604, such as multiple CPUs and/or multiple system memories.

The MCH 1608 may also include a graphics interface 1614 that communicates with a display 1616. In one embodiment of the invention, the graphics interface 1614 may communicate with the display 1616 via an accelerated graphics port (AGP). In an embodiment of the invention, the display 1616 may be a flat panel display that communicates with the graphics interface 1614 through, for example, a signal converter that translates a digital representation of an image stored in a storage device such as video memory or system memory into display signals that are interpreted and displayed by the display 1616. The display signals produced by the interface 1614 may pass through various control devices before being interpreted by and subsequently displayed on the display 1616.

A hub interface 1618 may allow the MCH 1608 and an input/output control hub (ICH) 1620 to communicate. The ICH 1620 may provide an interface to I/O devices that communicate with the computing system 1600. The ICH 1620 may communicate with a bus 1622 through a peripheral bridge (or controller) 1624, such as a peripheral component interconnect (PCI) bridge, a universal serial bus (USB) controller, or other types of peripheral bridges or controllers. The bridge 1624 may provide a data path between the CPU 1602 and peripheral devices. Other types of topologies may be utilized. Also, multiple buses may communicate with the ICH 1620, e.g., through multiple bridges or controllers. Moreover, other peripherals in communication with the ICH 1620 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 1622 may communicate with an audio device 1626, one or more disk drive(s) 1628, and a network interface device 1630, which may be in communication with the computer network 1603. In an embodiment, the device 1630 may be a NIC capable of wireless communication. Other devices may communicate via the bus 1622. Also, various components (such as the network interface device 1630) may communicate with the MCH 1608 in some embodiments of the invention. In addition, the processor 1602 and the MCH 1608 may be combined to form a single chip. Furthermore, the graphics interface 1614 may be included within the MCH 1608 in other embodiments of the invention.

Furthermore, the computing system 1600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 1628), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 1600 may be arranged in a point-to-point (PtP) configuration such as discussed with reference to FIG. 17. For example, processors, memory, and/or input/output devices may be interconnected by a number of point-to-point interfaces.

Figure 17:
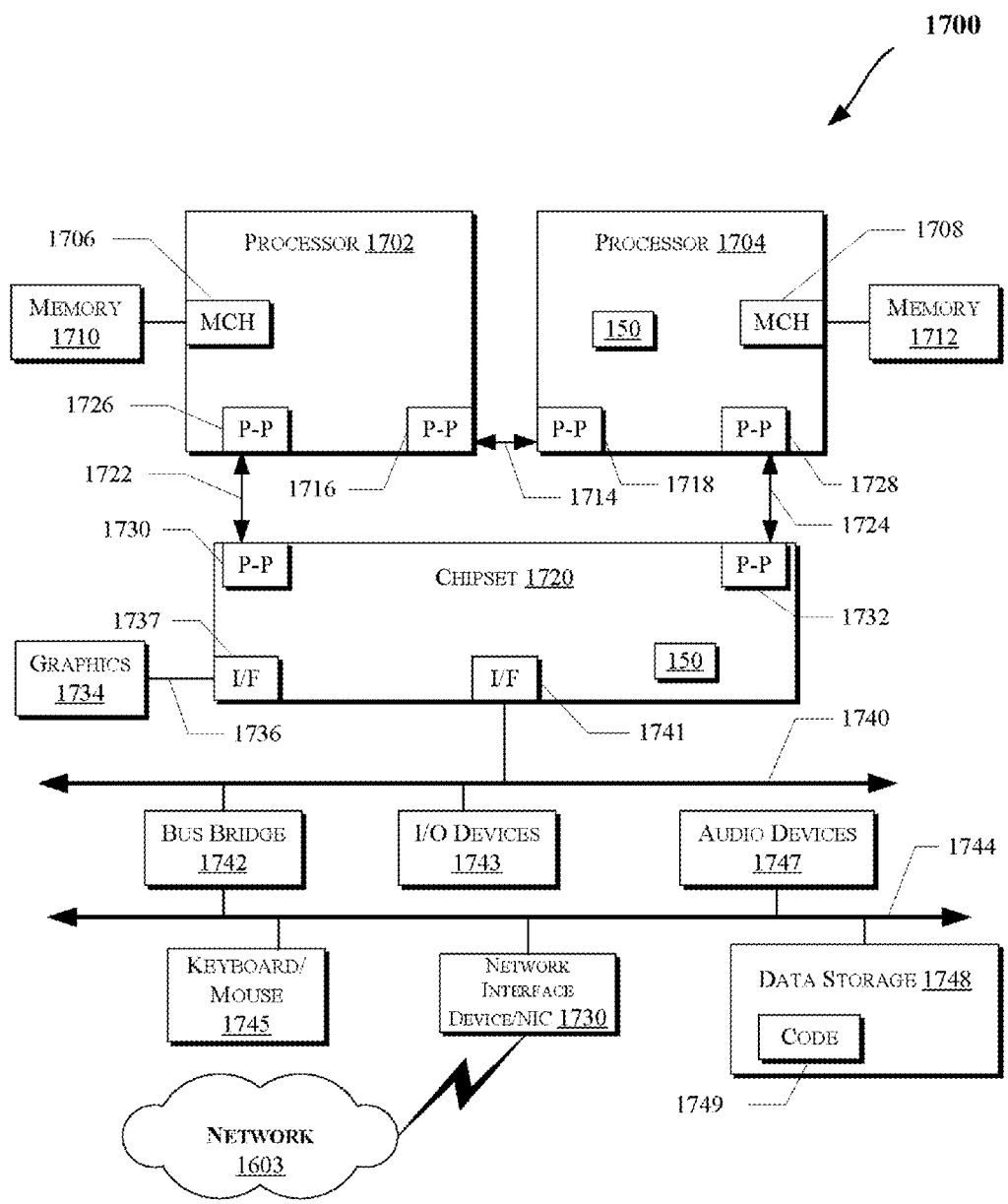

More specifically, FIG. 17 illustrates a computing system 1700 that is arranged in a point-to-point (PtP) configuration, according to an embodiment of the invention. In particular, FIG. 17 shows a system where processors, memory, and input/output devices are interconnected by a number of point-to-point interfaces. The operations discussed with reference to FIGS. 1-16 may be performed by one or more components of the system 1700. Also, various components of system 1700 may include the cipher logic 150, e.g., to encrypt and/or decrypt data, including multimedia content (such as audio and/or video data). Even though presence of logic 150 is shown in some components of system 1700, logic 150 may be present in more or less components.

As illustrated in FIG. 17, the system 1700 may include several processors, of which only two, processors 1702 and 1704 are shown for clarity. The processors 1702 and 1704 may each include a local memory controller hub (MCH) 1706 and 1708 to couple with memories 1710 and 1712. The memories 1710 and/or 1712 may store various data such as those discussed with reference to the memory 1612 of FIG. 16.

The processors 1702 and 1704 may be any suitable processor such as those discussed with reference to the processors 1602 of FIG. 16. The processors 1702 and 1704 may exchange data via a point-to-point (PtP) interface 1714 using PtP interface circuits 1716 and 1718, respectively. The processors 1702 and 1704 may each exchange data with a chipset 1720 via individual PtP interfaces 1722 and 1724 using point to point interface circuits 1726, 1728, 1730, and 1732. The chipset 1720 may also exchange data with a high-performance graphics circuit 1734 via a high-performance graphics interface 1736, using a PtP interface circuit 1737.

At least one embodiment of the invention may be provided by utilizing the processors 1702 and 1704. For example, the processors 1702 and/or 1704 may perform one or more of the operations of FIGS. 1-16. Other embodiments of the invention, however, may exist in other circuits, logic units, or devices within the system 1700 of FIG. 17. Furthermore, other embodiments of the invention may be distributed throughout several circuits, logic units, or devices illustrated in FIG. 17.

The chipset 1720 may be coupled to a bus 1740 using a PtP interface circuit 1741. The bus 1740 may have one or more devices coupled to it, such as a bus bridge 1742 and I/O devices 1743. Via a bus 1744, the bus bridge 1742 may be coupled to other devices such as a keyboard/mouse 1745, the network interface device 1730 discussed with reference to FIG. 17 (such as modems, network interface cards (NICs), or the like that may be coupled to the computer network 1603), audio I/O device, and/or a data storage device 1748. The data storage device 1748 may store code 1749 that may be executed by the processors 1702 and/or 1704.

Figure 18:
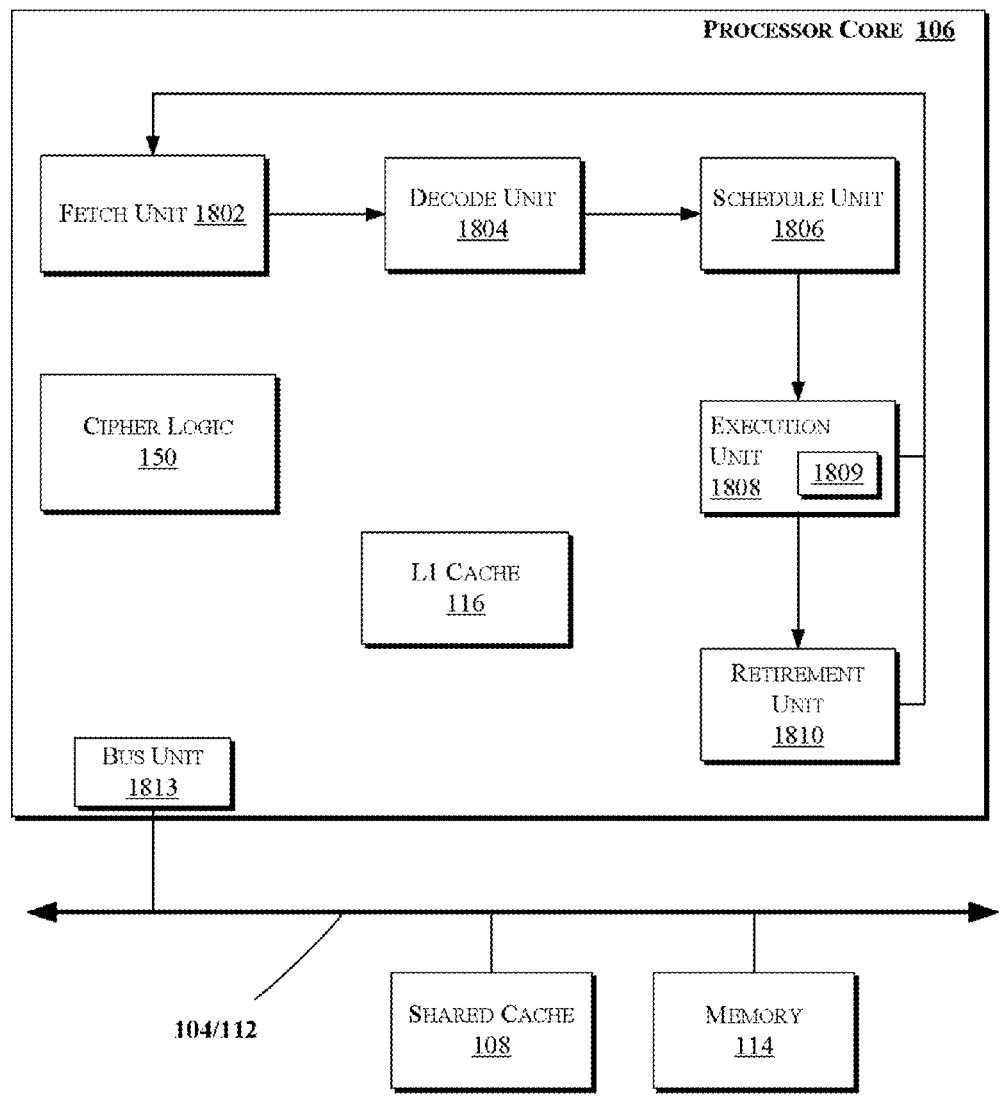
FIG. 18 illustrates a block diagram of portions of a processor core and other components of a computing system, according to an embodiment of the invention.

FIG. 18 illustrates a block diagram of portions of a processor core and other components of a computing system, according to an embodiment of the invention. In an embodiment, at least some of processors discussed herein (e.g., with reference to FIG. 1, 16, or 17) may include one or more of the component of the processor core 106 shown in FIG. 18. Also, a processor may include a single or multi-core 106, which may be homogeneous/symmetric or heterogeneous/asymmetric, etc. such as discussed herein, e.g., with reference to FIG. 1, 16, or 17. In one embodiment, the arrows shown in FIG. 18 illustrate the flow direction of instructions through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), memory controllers, or other components.

As illustrated in FIG. 18, the processor core 106 may include a fetch unit 1802 to fetch instructions for execution by the core 106. The instructions may be fetched from any storage devices such as the memory 114 and/or the memory devices discussed with reference to FIG. 16 or 17. The core 106 may optionally include a decode unit 1804 to decode the fetched instruction. In an embodiment, the decode unit 1804 may decode the fetched instruction into a plurality of uops (micro-operations). Some embodiments of the processor core 106 may not include decode unit 1804. Hence, the core 106 may process instructions without decoding them. Additionally, the core 106 may include a schedule unit 1806. The schedule unit 1806 may perform various operations associated with storing decoded instructions (e.g., received from the decode unit 1804) until the instructions are ready for dispatch, e.g., until all source values of a decoded instruction become available.

In one embodiment, the schedule unit 1806 may schedule and/or issue (or dispatch) decoded instructions to an execution unit 1808 for execution. The execution unit 1808 may execute the dispatched instructions after they are dispatched (e.g., by the schedule unit 1806) and, if applicable, decoded (e.g., by the decode unit 1804). In an embodiment, the execution unit 1808 may include more than one execution unit, such as one or more memory execution units, one or more integer execution units, one or more floating-point execution units (1809), or other execution units. The execution unit 1808 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 1808.

Further, the execution unit 1808 may execute instructions out-of-order. Hence, the processor core 106 may be an out-of-order processor core in one embodiment. The core 106 may also include a retirement unit 1810. The retirement unit 1810 may retire executed instructions (e.g., in order) after they are committed. In an embodiment, retirement of the executed instructions may result in processor state being committed from the execution of the instructions, physical registers used by the instructions being de-allocated, etc.

The core 106 may further include the cipher logic 150 (such as the logic 150 discussed with respect to any of the previous figures). Additionally, the core 106 may include a bus unit 1813 to allow communication between components of the processor core 106 and other components (such as the components discussed with reference to FIG. 1, 16, or 17) via one or more buses (e.g., buses 104 and/or 112).

In various embodiments of the invention, the operations discussed herein, e.g., with reference to FIGS. 1-18, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed herein.

Additionally, such tangible computer-readable media may be downloaded as a computer program product, wherein the program may be transferred from a remote computer (e.g., a server) to a requesting computer (e.g., a client) by way of data signals in a propagation medium via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus for generating new encrypt or decrypt round keys per machine cycle, the apparatus comprising:
   a first logic circuit to generate a second cipher key, in a second cycle, based on a first cipher key, wherein the first cipher key is to be generated by the same first logic circuit in a first cycle that immediately precedes the second cycle, and wherein the first logic circuit is to comprise a plurality of substitution boxes to perform substitute byte operations on portions of the first cipher key to generate corresponding portions of the second cipher key;
   a second logic circuit to encrypt or decrypt content data based on the second cipher key, wherein the first logic circuit is to generate the second cipher key without storing data in a shared memory and wherein the shared memory is accessible by more than a producer and a consumer;
   logic circuitry to rotate a portion of the first cipher key, wherein a substitution box is to perform a substitute byte operation on the rotated portion of the first cipher key to generate a corresponding portion of the second cipher key; and
   a logic block to conditionally perform an inverse mix columns operation to generate the second cipher key during a decrypt mode if the second cipher key is not a first round decrypt key or a last round decrypt key.

2. The apparatus of claim 1, wherein the first logic circuit is to generate the second cipher key in a single cycle.

3. The apparatus of claim 1, wherein the first logic circuit is to generate the second cipher key in accordance with Advanced Encryption Standard (AES).

4. The apparatus of claim 1, wherein the first logic circuit is to generate the second cipher key for one or more of mapped or native composite Galois Field encryption or decryption.

5. The apparatus of claim 1, wherein the first logic circuit is capable to generate the second cipher key in accordance with Advanced Encryption Standard (AES), AES-128, AES-192, and AES-256 modes.

6. The apparatus of claim 1, wherein the initial key is user supplied key.

7. The apparatus of claim 1, further comprising a processor that is to comprise the first logic circuit.

8. The apparatus of claim 7, wherein the processor is to comprise a plurality of processor cores and wherein at least one of the plurality of processor cores is to comprise the first logic circuit.

9. A system for generating new encrypt or decrypt round keys per machine cycle, the system comprising:
   a memory to store content data;
   a first logic circuit to generate a second cipher key, in a second cycle, based on a first cipher key, wherein the first cipher key is to be generated by the same first logic circuit in a first cycle that immediately follows the second cycle; and wherein the first logic circuit is to comprise a plurality of substitution boxes to perform substitute byte operations on portions of the first cipher key to generate corresponding portions of the second cipher key;
   a second logic circuit to encrypt or decrypt the content data based on the second cipher key, wherein the first logic circuit is to generate the second cipher key without storing data in a shared memory accessible by more than a producer and a consumer;
   logic circuitry to rotate a portion of the first cipher key, wherein a substitution box is to perform a substitute byte operation on the rotated portion of the first cipher key to generate a corresponding portion of the second cipher key; and
   a logic block to conditionally perform an inverse mix columns operation to generate the second cipher key during a decrypt mode if the second cipher key is not a first round decrypt key or a last round decrypt key.

10. The system of claim 9, further comprising an audio device coupled to the first logic circuit.

* * * * *